US010551974B2

(12) United States Patent
Lee et al.

(10) Patent No.: US 10,551,974 B2
(45) Date of Patent: Feb. 4, 2020

(54) TOUCH SCREEN PANEL AND METHOD OF MANUFACTURING THE SAME

(71) Applicant: Samsung Display Co., Ltd., Yongin-si (KR)

(72) Inventors: In-Nam Lee, Yongin-si (KR); Dae-Won Kim, Seongnam-si (KR); Hee-Woong Park, Hwaseong-si (KR); Jeong-Heon Lee, Seongnam-si (KR); Choon-Hyop Lee, Suwon-si (KR); Mi-Hee Son, Chungju-si (KR); Ga-Yeon Yun, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 23 days.

(21) Appl. No.: 15/227,617

(22) Filed: Aug. 3, 2016

(65) Prior Publication Data

US 2017/0199594 A1    Jul. 13, 2017

(30) Foreign Application Priority Data

Jan. 13, 2016   (KR) ........................ 10-2016-0004184

(51) Int. Cl.
  *G06F 3/044*       (2006.01)
(52) U.S. Cl.
  CPC .... *G06F 3/044* (2013.01); *G06F 2203/04103* (2013.01)
(58) Field of Classification Search
  CPC ......... G06F 3/044; G06F 3/041; G06F 3/0412
  USPC .............................. 1/1; 216/13; 345/173, 174
  See application file for complete search history.

(56) References Cited

U.S. PATENT DOCUMENTS

| 9,207,720 | B2 | 12/2015 | Kang et al. |
| 2011/0096018 | A1* | 4/2011 | Lee ........................ G06F 3/044 345/174 |
| 2011/0148780 | A1* | 6/2011 | Lu .......................... G06F 3/044 345/173 |
| 2014/0151325 | A1* | 6/2014 | Baek ..................... G06F 3/044 216/13 |
| 2014/0192007 | A1* | 7/2014 | Westhues ............... G06F 3/044 345/174 |
| 2015/0153877 | A1 | 6/2015 | Han et al. |
| 2015/0160764 | A1 | 6/2015 | Bae et al. |

(Continued)

FOREIGN PATENT DOCUMENTS

| KR | 10-2013-0104857 | 9/2013 |
| KR | 10-2015-0059194 | 6/2015 |

(Continued)

*Primary Examiner* — Abdul-Samad A Adediran
(74) *Attorney, Agent, or Firm* — H.C. Park & Associates, PLC

(57) ABSTRACT

A touch screen panel including a base substrate, a first touch electrode disposed on the base substrate and including a first sensing electrode disposed along a first direction and a first sensing connection portion connected to the first sensing electrode and having a first width, an insulation layer disposed on the first touch electrode, and a second touch electrode disposed on the insulation layer and including a second sensing electrode disposed along a second direction crossing the first direction and a second sensing connection portion connected to the second sensing electrode and having a second width. The second width is equal to or greater than one and a half times the first width.

18 Claims, 13 Drawing Sheets

(56) References Cited

U.S. PATENT DOCUMENTS

2015/0253882 A1\* 9/2015 Lee .................. G06F 3/041
                                                    345/173
2016/0266670 A1\* 9/2016 Chen ................ G06F 3/0412

FOREIGN PATENT DOCUMENTS

| KR | 10-2015-0063760 | 6/2015 |
| KR | 10-2015-0068064 | 6/2015 |

\* cited by examiner

TOUCH SCREEN PANEL AND METHOD OF MANUFACTURING THE SAME

CROSS-REFERENCE TO RELATED APPLICATION

This application claims priority from and the benefit of Korean Patent Application No. 10-2016-0004184, filed on Jan. 13, 2016, which is hereby incorporated by reference for all purposes as if fully set forth herein.

BACKGROUND

Field

Exemplary embodiments relate to a touch screen panel and a method of manufacturing the touch screen panel.

Discussion of the Background

A touch screen panel is an input device which enables a command to be inputted by touching a screen of a display device using an object, such as a finger or a pen. Since such a touch screen can be substituted for a separate input device connected to a display device, such as a keyboard or a mouse, its application fields have been gradually extended.

As demands on various types of display devices have recently increased with the development of an information society, studies on display devices, such as a liquid crystal display device (LCD), a plasma display panel (PDP), a field emission display device (FED), and electrophoretic display device (EPD) and an organic light emitting display device (OLED), have been actively conducted. Recently, studies have been conducted to apply a touch screen panel function to such display devices.

Touch screen panels may be classified into a resistive type, a photosensitive type, a capacitive type, and the like. The capacitive type touch screen panel may convert information of a contact position into an electrical signal by sensing a change in the capacitance generated between a conductive sensing electrode and an adjacent sensing electrode or ground electrode when an object, such as a user's hand or a pen, comes in contact with the touch screen panel.

A touch screen panel may include a sensing electrode sensing a touch position and a connecting portion connecting the sensing electrodes. A width of the connecting portion is less than a width of the sensing electrode. Thus, a resistance of the connecting portion is greater than a resistance of the sensing electrode. Accordingly, disconnection of the connecting portion due to static electricity may occur, and the number of defects of the touch screen panel may be increased.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch screen panel having a reduced number of defects.

Exemplary embodiments also provide a method of manufacturing the touch screen panel.

Additional aspects will be set forth in the detailed description which follows, and, in part, will be apparent from the disclosure, or may be learned by practice of the inventive concept.

An exemplary embodiment discloses a touch screen panel including a base substrate, a first touch electrode disposed on the base substrate and including a first sensing electrode disposed along a first direction and a first sensing connection portion connected to the first sensing electrode and having a first width, an insulation layer disposed on the first touch electrode, and a second touch electrode disposed on the insulation layer and including a second sensing electrode disposed along a second direction crossing the first direction and a second sensing connection portion connected to the second sensing electrode and having a second width. The second width is equal to or greater than one and a half times the first width.

An exemplary embodiment also discloses a method of manufacturing a touch screen panel including forming a first touch electrode on a base substrate, forming an insulation layer on the first touch electrode, and forming a second touch electrode on the insulation layer. Forming the first touch electrode includes forming a plurality of first sensing electrodes in a first direction and forming a first sensing connection portion with a first width connecting the plurality of first sensing electrodes. Forming the second touch electrodes includes forming a plurality of second sensing electrodes in a second direction crossing the first direction and forming a second sensing connection portion with a second width connecting the plurality of second sensing electrodes. The second width is equal to or greater than one and a half times the first width.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
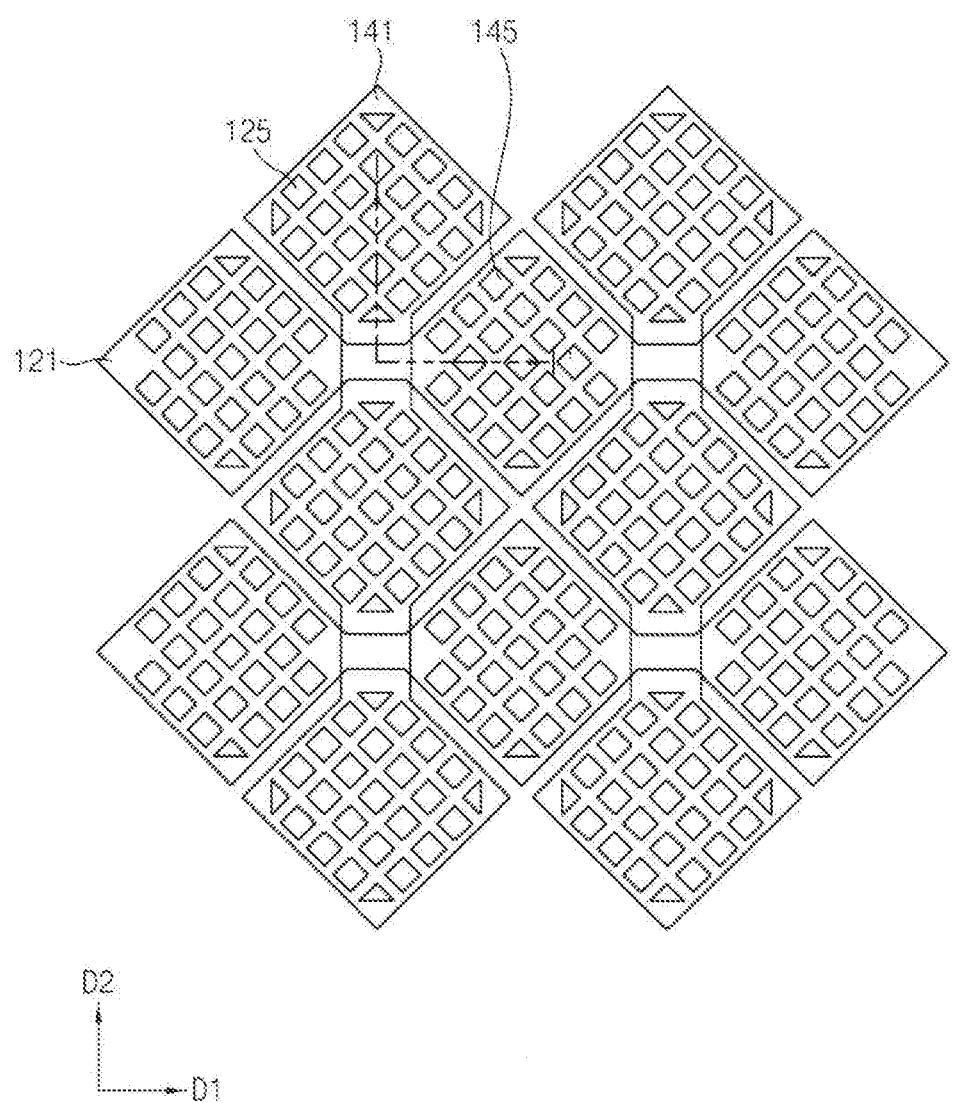
FIG. 1 is a schematic plan view of a touch screen panel according to an exemplary embodiment.
Figure 2:
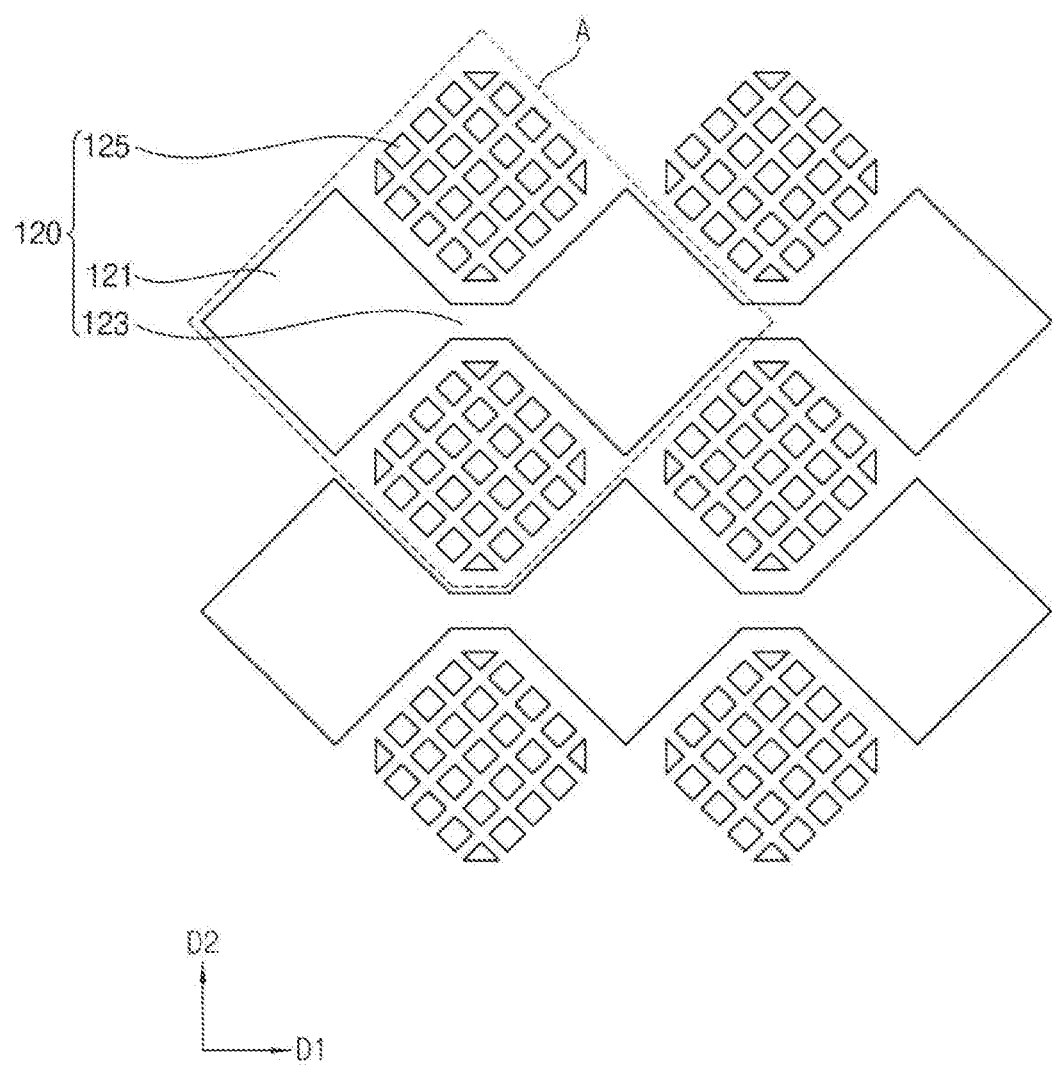
FIG. 2 is a schematic plan view of a first touch electrode of the touch screen panel of FIG. 1 according to an exemplary embodiment.
Figure 3:
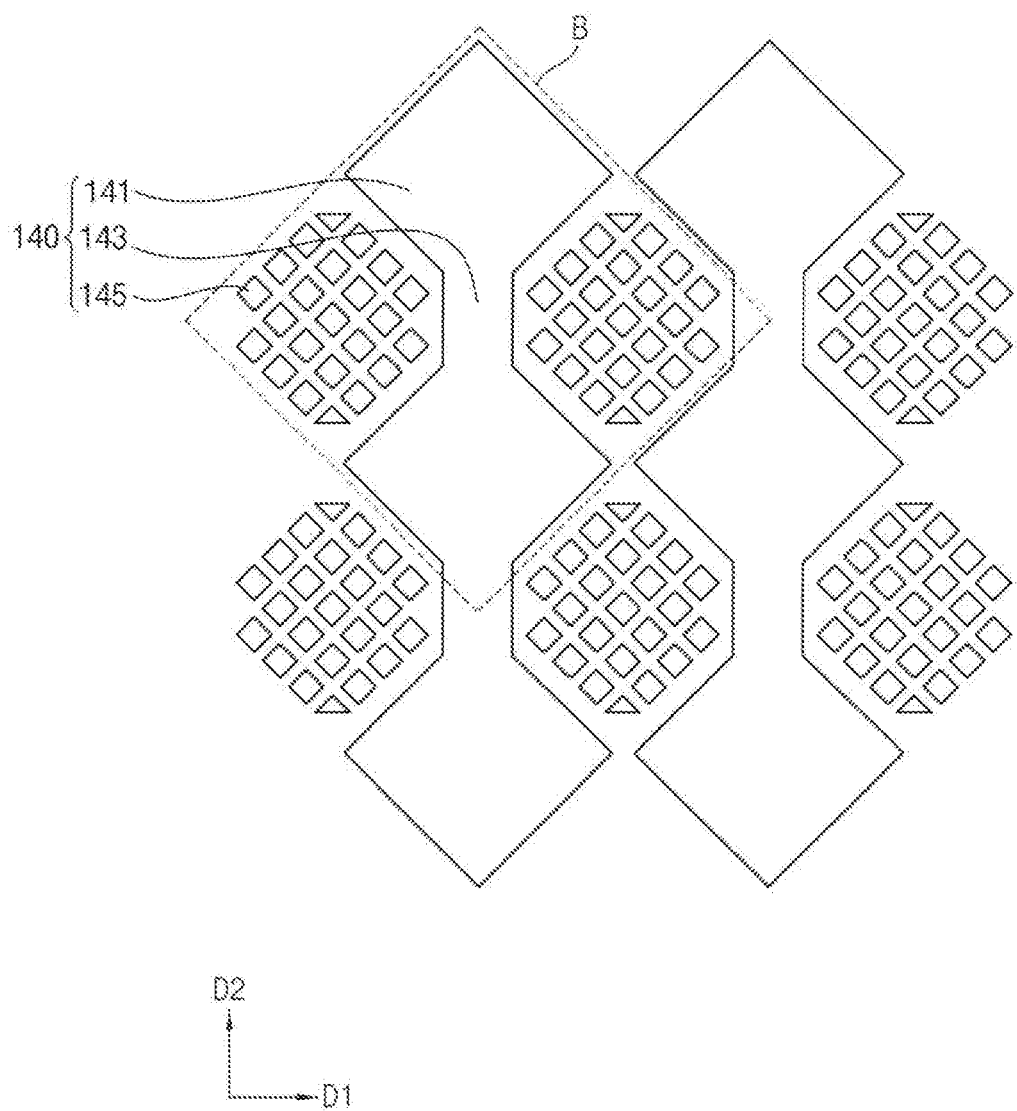
FIG. 3 is a schematic plan view of a second touch electrode of the touch screen panel of FIG. 1 according to an exemplary embodiment.
Figure 4:
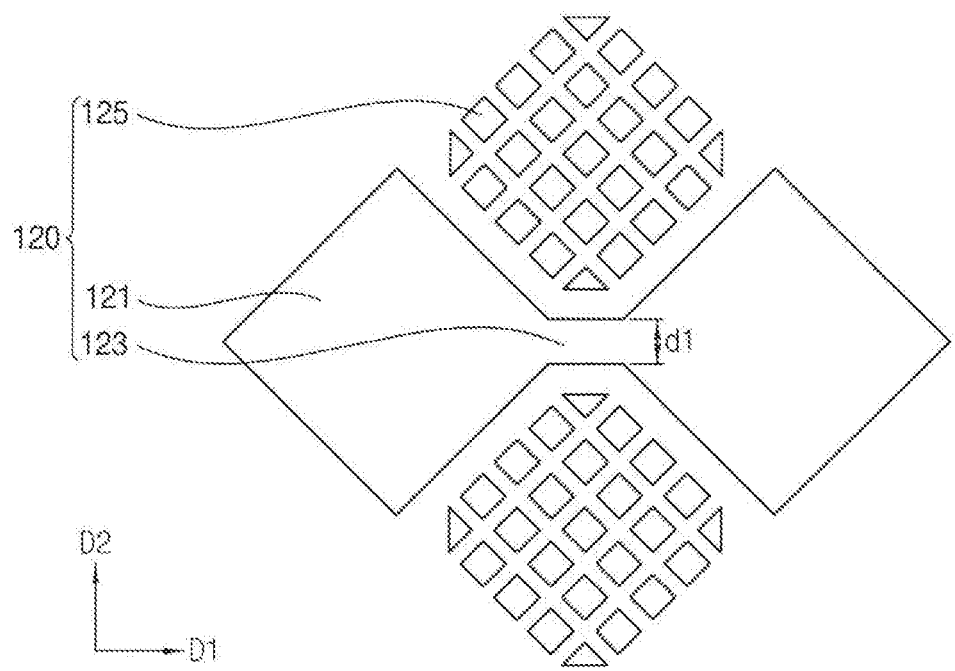
FIG. 4 is a schematic enlarged plan view of a portion "A" of the touch screen panel of FIG. 2 according to an exemplary embodiment.
Figure 5:
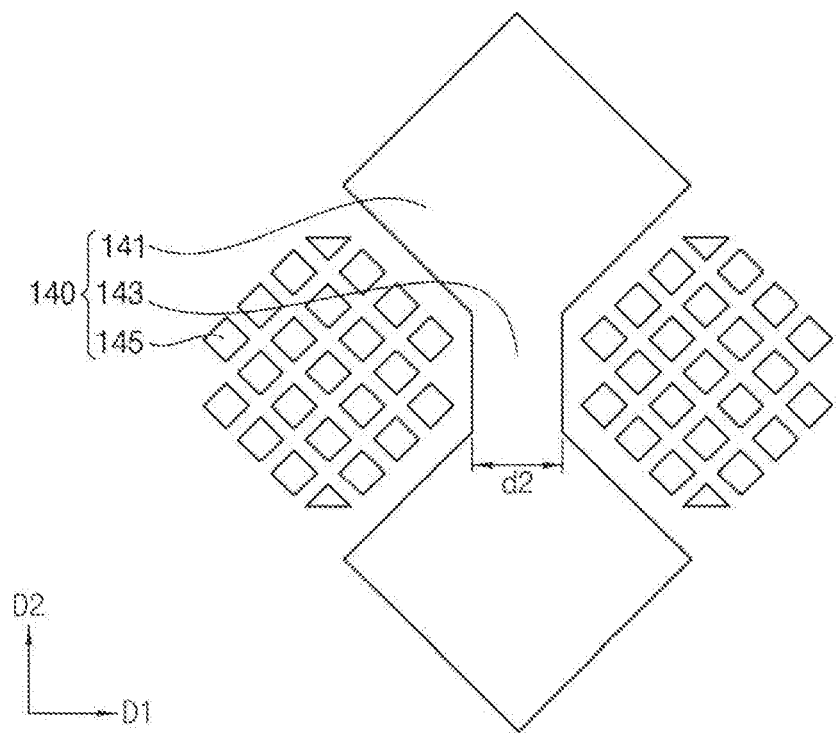
FIG. 5 is a schematic enlarged plan view of a portion "B" of the touch screen panel of FIG. 3 according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Referring to FIGS. 1 to 6, a touch screen panel includes a base substrate 110, a first touch electrode 120, an insulation layer 130, and a second touch electrode 140.

The base substrate 110 may include transparent materials. For example, the base substrate 110 may include at least one of quartz, synthetic quartz, calcium fluoride, fluoride-doping quartz, a soda lime glass, and a non-alkali glass.

The base substrate 110 may include a flexible transparent resin substrate. For example, the flexible transparent resin substrate for the base substrate 110 may include a polyimide substrate. The polyimide substrate may include a first polyimide layer, a barrier film layer, and a second polyimide layer. When the polyimide substrate is thin and flexible, the polyimide substrate may be disposed on a rigid glass substrate for the formation of the light emitting structure.

The base substrate 110 may have a structure in which the first polyimide layer, the barrier film layer and the second polyimide layer are stacked on a glass substrate, but it is not limited thereto. The flexible transparent resin substrate may include various films. For example, the base substrate 110 may include a Cyclo Olefin Polymer ("COP") film.

The first touch electrode 120 may be disposed on the base substrate 110. The first touch electrode 120 may include a first sensing pattern and a first dummy pattern 125. The first sensing pattern may include a plurality of first sensing electrodes 121 and a first sensing connecting portion 123.

The plurality of first sensing electrodes 121 may have a rhombus shape. The plurality of first sensing electrodes 121 may be connected by the first sensing connecting portion 123. The plurality of first sensing electrodes 121 may extend in a first direction D1 connected by the first sensing connecting portion 123. The plurality of first sensing electrodes 121 and the first sensing connecting portion 123 may be disposed on the same layer.

The first sensing connecting portion 123 may have a first width d1. For example, the first width d1 may be equal to or greater than 100 micrometers.

The first dummy pattern 125 may have first sub-dummy patterns spaced apart from one another. The first sub-dummy patterns may have a rhombus shape smaller than the plurality of first sensing electrodes 121. The first dummy pattern 125 and the plurality of first sensing electrodes 121 may be disposed on the same layer.

The first touch electrode 120 may include a transparent conductive material. For example, the first touch electrode 120 may include indium tin oxide (ITO) or indium zinc oxide (IZO).

The insulation layer 130 may be disposed on the first touch electrode 120. The insulation layer 130 may be a dry film photoresist. When the insulation layer 130 is a dry film photoresist, the dry film photoresist may be used for forming the second touch electrode 140, and the dry film photoresist may provide an insulating function between the first touch electrode 120 and the second touch electrode 140.

When the dry film photoresist replaces an insulation layer, a thickness of a display device may be decreased. The insulation layer 130 may include an inorganic insulating material, such as silicon oxide ($SiO_x$) and/or silicon nitride ($SiN_x$). For example, the insulation layer 130 may include a plurality of layers including various materials.

The second touch electrode 140 may be disposed on the insulation layer 130. The second touch electrode 140 may include a second sensing pattern and a second dummy pattern 145. The second sensing pattern may include a plurality of second sensing electrodes 141 and a second sensing connecting portion 143.

The plurality of second sensing electrodes 141 may have a rhombus shape. The plurality of second sensing electrodes 141 may be connected by the second sensing connecting portion 143. The plurality of second sensing electrodes 141 may extend in a second direction D2 connected by the second sensing connecting portion 143. The second direction D2 may cross the first direction D1. The plurality of second sensing electrodes 141 and the second sensing connecting portion 143 may be disposed on the same layer.

The second sensing connecting portion 143 may have a second width d2. The second width d2 of the second sensing connecting portion 143 may be greater than the first width d1 of the first sensing connecting portion 123. The second width d2 may be equal to or greater than one and a half times the first width d1. The second width d2 may be two and a half times the first width d1. For example, the second width d2 may be equal to or greater than 150 micrometers. The first width d1 may be about 200 micrometers and the second width d2 may be about 500 micrometers.

The second dummy pattern 145 may have second sub-dummy patterns spaced apart from one another. The second sub-dummy patterns may have a rhombus shape. The second dummy pattern 145 and the plurality of second sensing electrodes 141 may be disposed on the same layer.

The second touch electrode 140 may include a silver nanowire, but it is not limited thereto. The second touch electrode 140 may include a metal nanowire, such as gold (Au), silver (Ag), or copper (Cu).

A sum of a thickness of the insulation layer 130 and a thickness of the second touch electrode 140 may be equal to or greater than 3 micrometers and equal to or less than 30 micrometers.

According to an exemplary embodiment, a width of the second sensing connecting portion 143 may be large, and thus, damage to the second sensing connecting portion 143 due to static electricity may be decreased. The second width d2 of the second sensing connecting portion 143 may be equal to or greater than one and a half times the first width d1 of the first sensing connecting portion 123, and thus, a sensitivity difference in touch electrodes may be decreased. A sum of a thickness of the insulation layer 130 and a thickness of the second touch electrode 140 may be decreased, and thus, the performance of a touch sensor may be improved.

Figure 7:
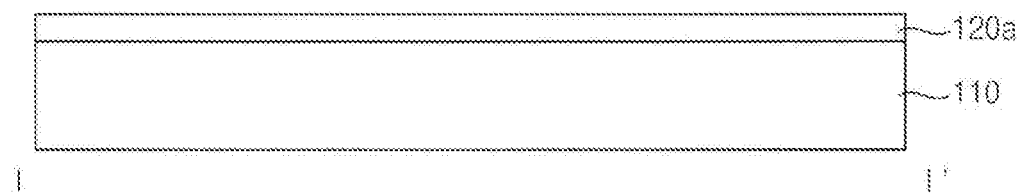
FIG. 7, FIG. 8, and FIG. 9 are cross-sectional views of the touch screen panel of FIG. 1 taken along sectional line I-I' according to an exemplary embodiment.
Figure 8:
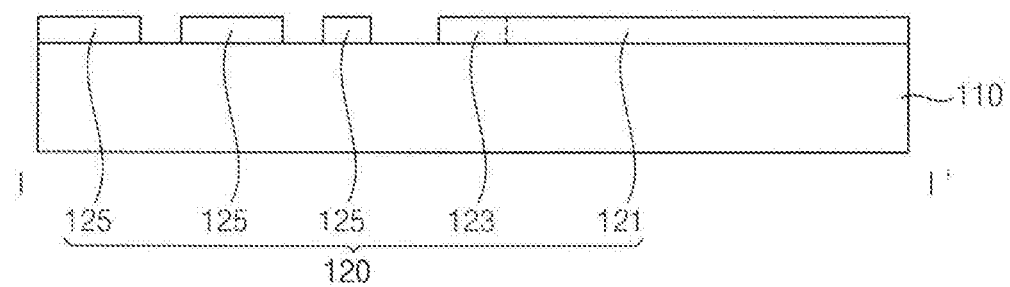
Figure 9:
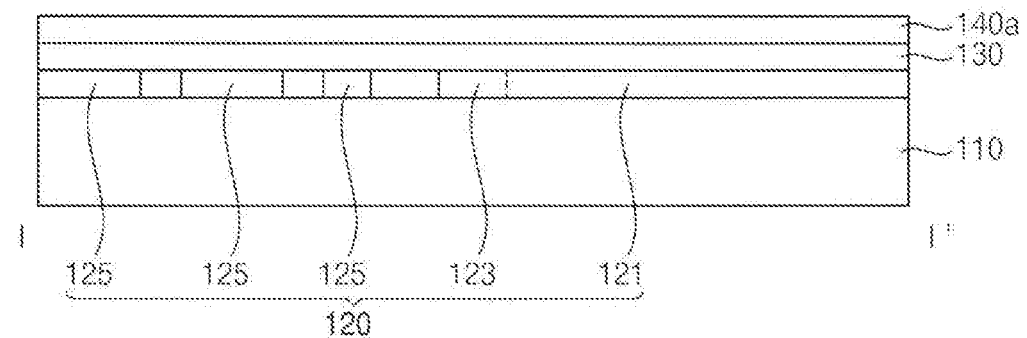

FIGS. 7 to 9 are cross-sectional views of the touch screen panel of FIG. 1 taken along sectional line I-I' according to an exemplary embodiment.

Referring to FIG. 7, a first touch electrode layer 120a may be disposed on the base substrate 110.

The base substrate 110 may include transparent materials. For example, the base substrate 110 may include at least one of quartz, synthetic quartz, calcium fluoride, fluoride-doping quartz, a soda lime glass, and a non-alkali glass.

The base substrate 110 may include a flexible transparent resin substrate. For example, the flexible transparent resin substrate for the base substrate 110 may include a polyimide substrate. The polyimide substrate may include a first polyimide layer, a barrier film layer, and a second polyimide layer. When the polyimide substrate is thin and flexible, the polyimide substrate may be disposed on a rigid glass substrate for the formation of the light emitting structure.

The base substrate 110 may have a structure in which the first polyimide layer, the barrier film layer and the second polyimide layer are stacked on a glass substrate, but the present invention is not limited thereto. The flexible transparent resin substrate may include various films. For example, the base substrate 110 may include a Cyclo Olefin Polymer ("COP") film.

The first touch electrode layer 120a may include a transparent conductive material. For example, the first touch electrode layer 120a may include indium tin oxide ("ITO") or indium zinc oxide ("IZO").

Referring to FIG. 8, the first touch electrode layer 120a disposed on the base substrate 110 may be patterned to form the first touch electrode 120.

The first touch electrode 120 may include a first sensing pattern and a first dummy pattern 125. The first sensing pattern may include a plurality of first sensing electrodes 121 and a first sensing connecting portion 123.

The first touch electrode 120 may include a transparent conductive material. For example, the first touch electrode 120 may include indium tin oxide ("ITO") or indium zinc oxide ("IZO").

Referring to FIG. 9, the insulation layer 130 and a second touch electrode layer 140a may be disposed on the base substrate 110 on which the first touch electrode 120 is disposed.

The insulation layer 130 may be a dry film photoresist. When the insulation layer 130 is a dry film photoresist, the dry film photoresist may be used for forming a second touch electrode, and the dry film photoresist may provide an insulating function between the first touch electrode 120 and the second touch electrode. When the dry film photoresist replaces an insulation layer, a thickness of a display device may be decreased.

The second touch electrode layer 140a may include a silver nanowire, but the present invention is not limited thereto. The second touch electrode layer 140a may include a metal nanowire, such as gold (Au), silver (Ag), or copper (Cu).

Figure 6:
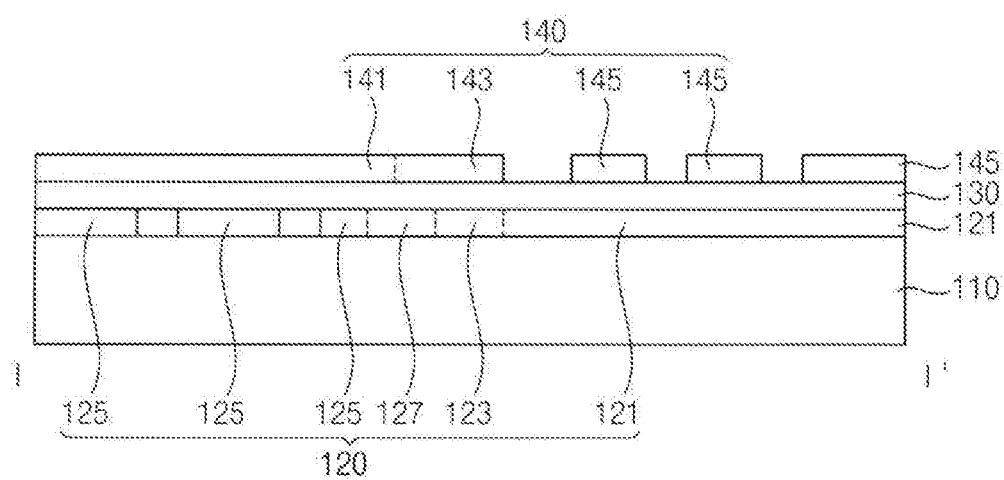
FIG. 6 is a cross-sectional view of the touch screen panel of FIG. 1 taken along sectional line I-I' according to an exemplary embodiment.

Referring to FIG. 6, the second touch electrode layer 140a disposed on the insulation layer 130 may be patterned to form the second touch electrode 140.

The second touch electrode 140 may include a second sensing pattern and a second dummy pattern 145. The second sensing pattern may include a plurality of second sensing electrodes 141 and a second sensing connecting portion 143.

The second touch electrode 140 may include a silver nanowire, but the present invention is not limited thereto. The second touch electrode 140 may include a metal nanowire, such as gold (Au), silver (Ag), or copper (Cu).

A sum of a thickness of the insulation layer 130 and a thickness of the second touch electrode 140 may be equal to or greater than 3 micrometers and equal to or less than 30 micrometers.

Referring to FIGS. 10 to 16, a touch screen panel may include a base substrate 1110, a first touch electrode 1120, an insulation layer 1130, and a second touch electrode 1140.

The base substrate 1110 may include transparent materials. For example, the base substrate 1110 may include at least one of quartz, synthetic quartz, calcium fluoride, fluoride-doping quartz, a soda lime glass, and a non-alkali glass.

The base substrate 1110 may include a flexible transparent resin substrate. For example, the flexible transparent resin substrate for the base substrate 1110 may include a polyimide substrate. The polyimide substrate may include a first polyimide layer, a barrier film layer, and a second polyimide layer. When the polyimide substrate is thin and flexible, the polyimide substrate may be disposed on a rigid glass substrate for the formation of the light emitting structure.

The base substrate 1110 may have a structure in which the first polyimide layer, the barrier film layer and the second polyimide layer are stacked on a glass substrate, but it is not limited thereto. The flexible transparent resin substrate may include various films. For example, the base substrate 1110 may include a Cyclo Olefin Polymer ("COP") film.

The first touch electrode 1120 may be disposed on the base substrate 1110. The first touch electrode 1120 may include a first sensing pattern and a first dummy pattern 1125. The first sensing pattern may include a plurality of first sensing electrodes 1121 and a first sensing connecting portion 1123.

The plurality of first sensing electrodes 1121 may have a rhombus shape. The plurality of first sensing electrodes 1121 may be connected by the first sensing connecting portion 1123. The plurality of first sensing electrodes 1121 may extend in a first direction D1 connected by the first sensing connecting portion 1123. The plurality of first sensing electrodes 1121 and the first sensing connecting portion 1123 may be disposed on the same layer.

The first sensing connecting portion 1123 may include a first sub-sensing connecting portion 1123a disposed adjacent to the plurality of first sensing electrodes 1121 and having a third width d12 and a second sub-sensing connecting portion 1123b connecting the first sub-sensing connecting portions 1123a and having a fourth width d11. The fourth width d11 may be less than the third width d12. For example, the fourth width d11 may be greater than 100 micrometers, and the third width d12 may be greater than 150 micrometers.

The first dummy pattern 1125 may have first sub-dummy patterns spaced apart from one another. The first sub-dummy patterns may have a rhombus shape smaller than the plurality of first sensing electrodes 1121. The first dummy pattern 1125 and the plurality of first sensing electrodes 1121 may be disposed on the same layer.

The first touch electrode 1120 may include a transparent conductive material. For example, the first touch electrode 1120 may include indium tin oxide ("ITO") or indium zinc oxide ("IZO").

The insulation layer 1130 may be disposed on the first touch electrode 1120. The insulation layer 1130 may be a dry film photoresist. When the insulation layer 1130 is a dry film photoresist, the dry film photoresist may be used for forming the second touch electrode 1140, and the dry film photoresist may provide an insulating function between the first touch electrode 1120 and the second touch electrode 1140.

When the dry film photoresist replaces an insulation layer, a thickness of a display device may be decreased. The insulation layer 1130 may include an inorganic insulating material, such as silicon oxide ($SiO_x$) and/or silicon nitride ($SiN_x$). For example, the insulation layer 1130 may include a plurality of layers including various materials.

The second touch electrode 1140 may be disposed on the insulation layer 1130. The second touch electrode 1140 may include a second sensing pattern and a second dummy pattern 1145. The second sensing pattern may include a plurality of second sensing electrodes 1141 and a second sensing connecting portion 1143.

The plurality of second sensing electrodes 1141 may have a rhombus shape. The plurality of second sensing electrodes 1141 may be connected by the second sensing connecting portion 1143. The plurality of second sensing electrodes 1141 may extend in a second direction D2 connected by the second sensing connecting portion 1143. The second direction D2 may cross the first direction D1. The plurality of second sensing electrodes 1141 and the second sensing connecting portion 1143 may be disposed on the same layer.

The second sensing connecting portion 1143 may have a fifth width d13. The fifth width d13 of the second sensing connecting portion 1143 may be greater than the third width d12 of the first sub-sensing connection portions 1123a of the first sensing connecting portion 1123. The fifth width d13 may be equal to or greater than one and a half times the third width d12. The fifth width d13 may be two and a half times the third width d12. For example, the fifth width d13 may be equal to or greater than 150 micrometers. The third width d12 may be about 200 micrometers and the fifth width d13 may be about 500 micrometers.

The second dummy pattern 1145 may have second sub-dummy patterns spaced apart from one another. The second sub-dummy patterns may have a rhombus shape. The second dummy pattern 1145 and the plurality of second sensing electrodes 1141 may be disposed on the same layer.

The second touch electrode 1140 may include a silver nanowire, but the present invention is not limited thereto. The second touch electrode 1140 may include a metal nanowire, such as gold (Au), silver (Ag), or copper (Cu).

A sum of a thickness of the insulation layer 1130 and a thickness of the second touch electrode 1140 may be equal to or greater than 3 micrometers and equal to or less than 30 micrometers.

According to an exemplary embodiment, a width of the second sensing connecting portion 1143 may be large, and thus, the possibility of damage to the second sensing connecting portion 1143 due to static electricity may be decreased. The fifth width d13 of the second sensing connecting portion 1143 may be equal to or greater than one and a half times the third width d12 of the first sub-sensing connection portions 1123a of the first sensing connecting portion 1123, and thus, a sensitivity difference in touch electrodes may be decreased. A sum of a thickness of the insulation layer 1130 and a thickness of the second touch electrode 1140 may be decreased, and thus, the performance of a touch sensor may be improved.

In addition, the first sensing connecting portion 1123 may include a first sub-sensing connecting portion 1123a disposed adjacent to the plurality of first sensing electrodes 1121 and having a third width d12 and a second sub-sensing connecting portion 1123b connecting the first sub-sensing connecting portions 1123a and having a fourth width d11. The fourth width d11 may be less than the third width d12. Since the first sensing connecting portion 1123 includes a first sub-sensing connecting portion 1123a having a large width, a resistance of the first sensing connecting portion 1123a may be decreased, and damage to the first sensing connecting portion 1123a due to static electricity may be decreased.

Figure 10:
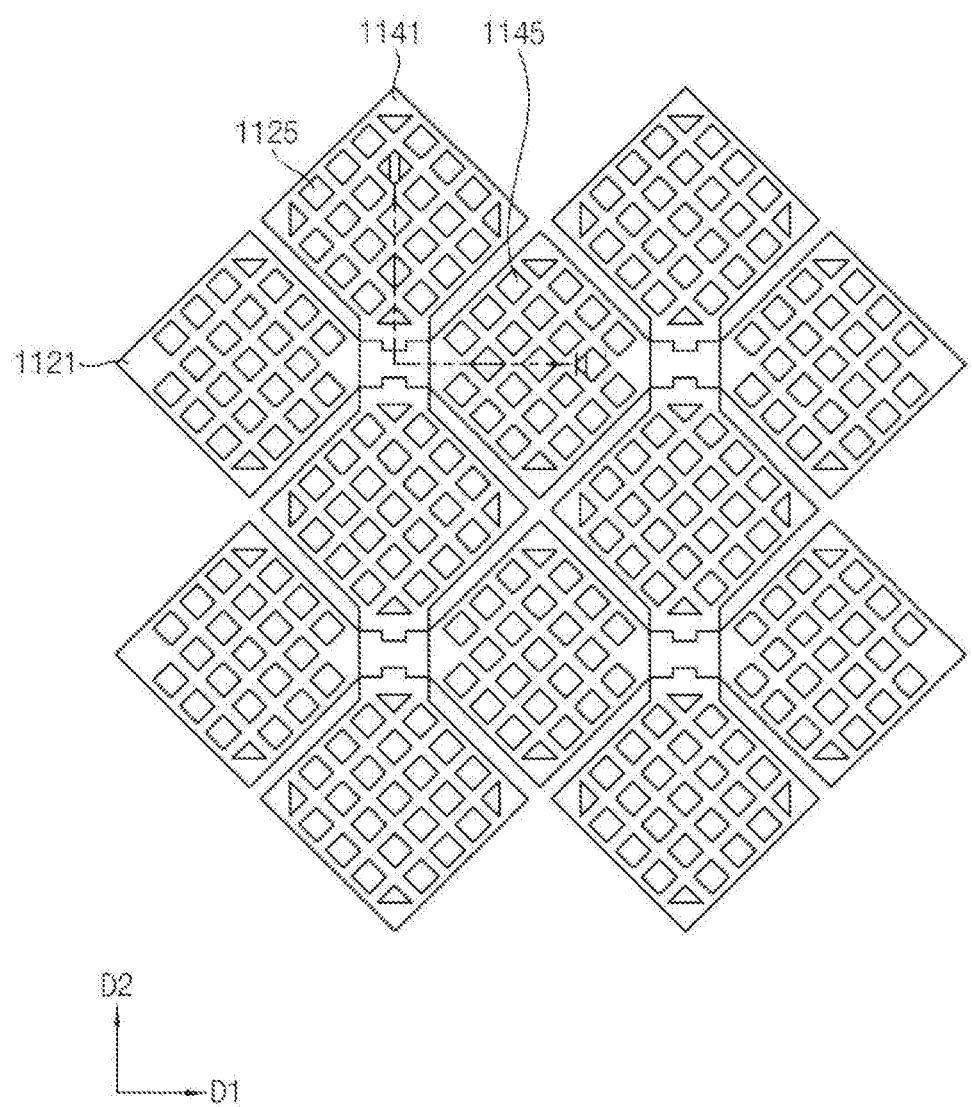
FIG. 10 is a schematic plan view of a touch screen panel according to an exemplary embodiment.
Figure 11:
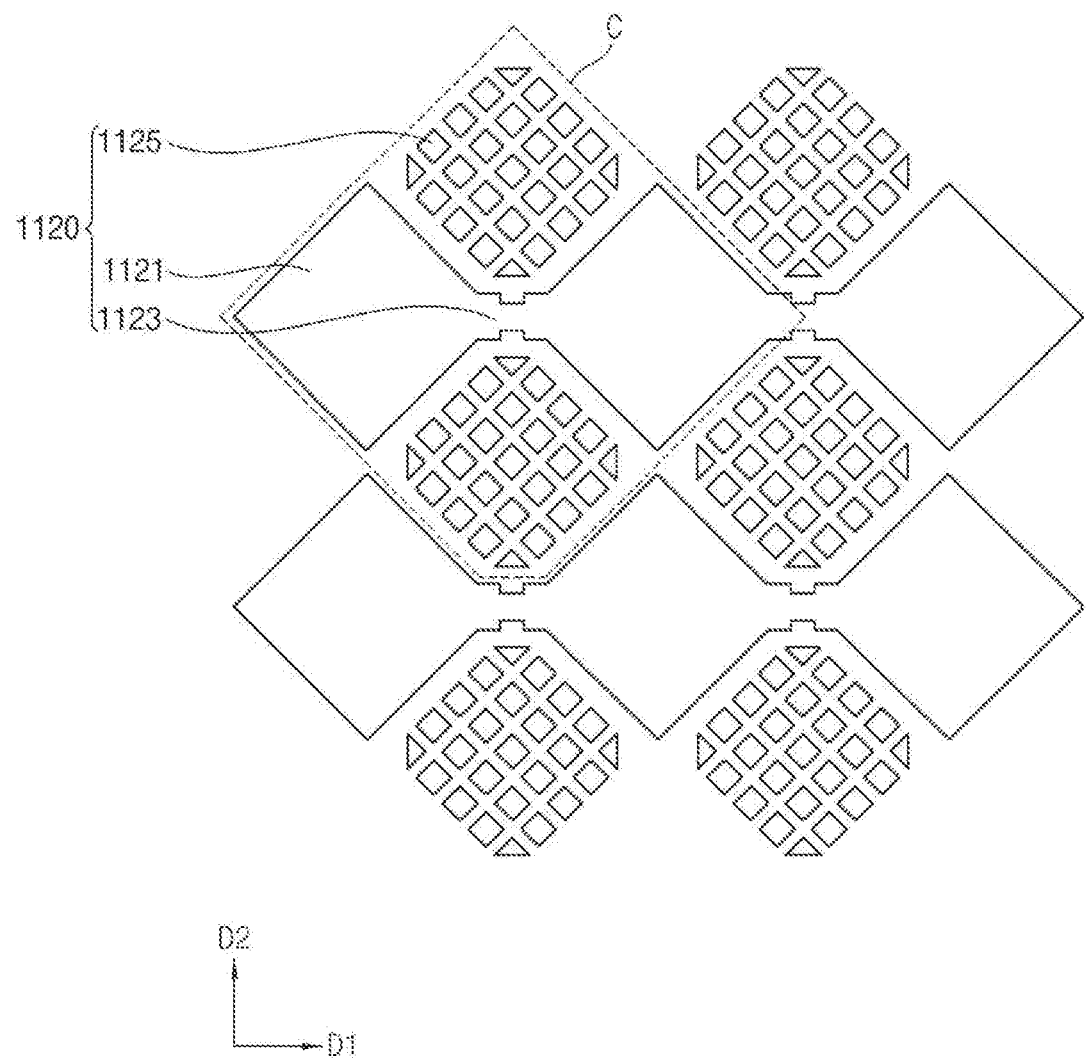
FIG. 11 is a schematic plan view of a first touch electrode of the touch screen panel of FIG. 10 according to an exemplary embodiment.
Figure 12:
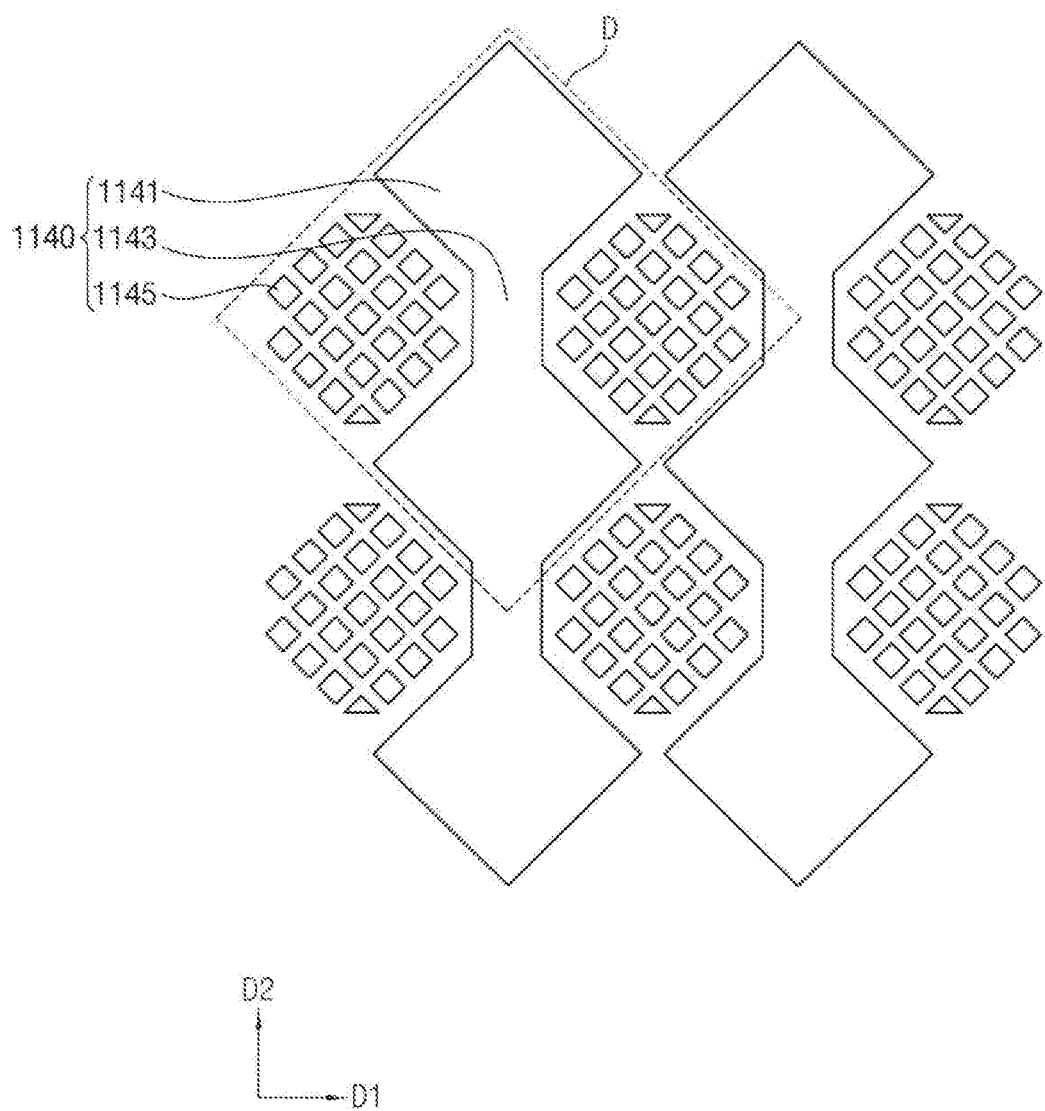
FIG. 12 is a schematic plan view of a second touch electrode of the touch screen panel of FIG. 10 according to an exemplary embodiment.
Figure 13:
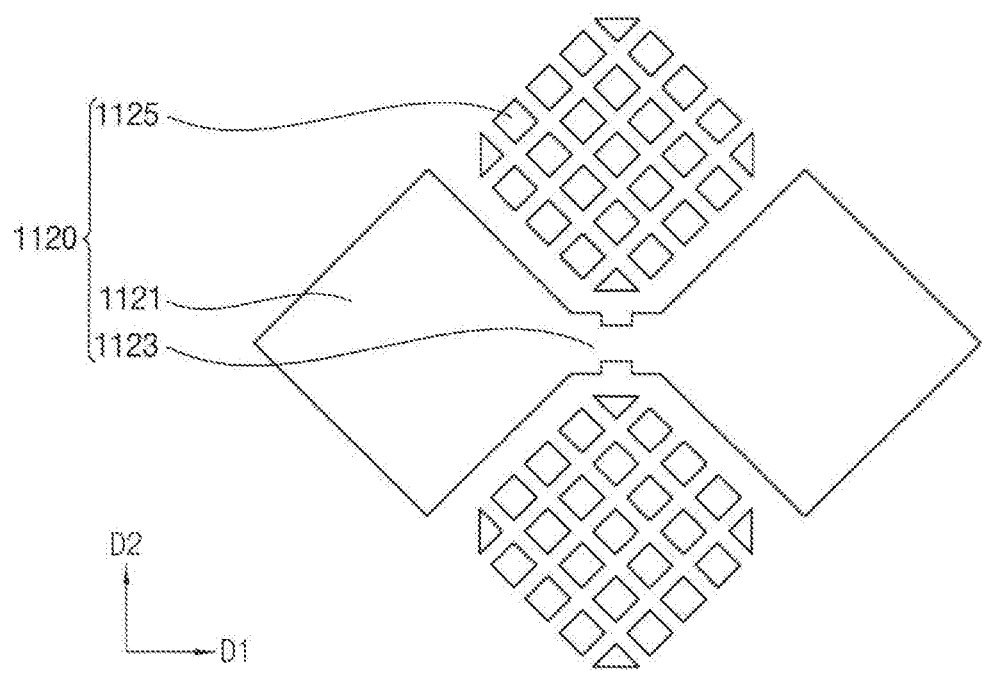
FIG. 13 is a schematic enlarged plan view of a portion "C" of the touch screen panel of FIG. 11 according to an exemplary embodiment.
Figure 14:
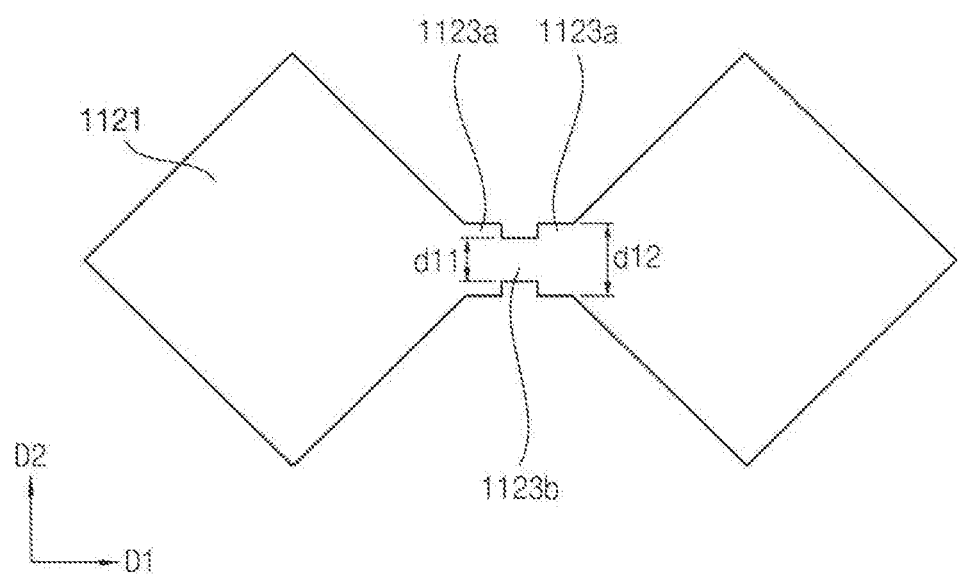
FIG. 14 is a schematic plan view of a first sensing electrode and a first sensing connecting portion of FIG. 13 according to an exemplary embodiment.
Figure 15:
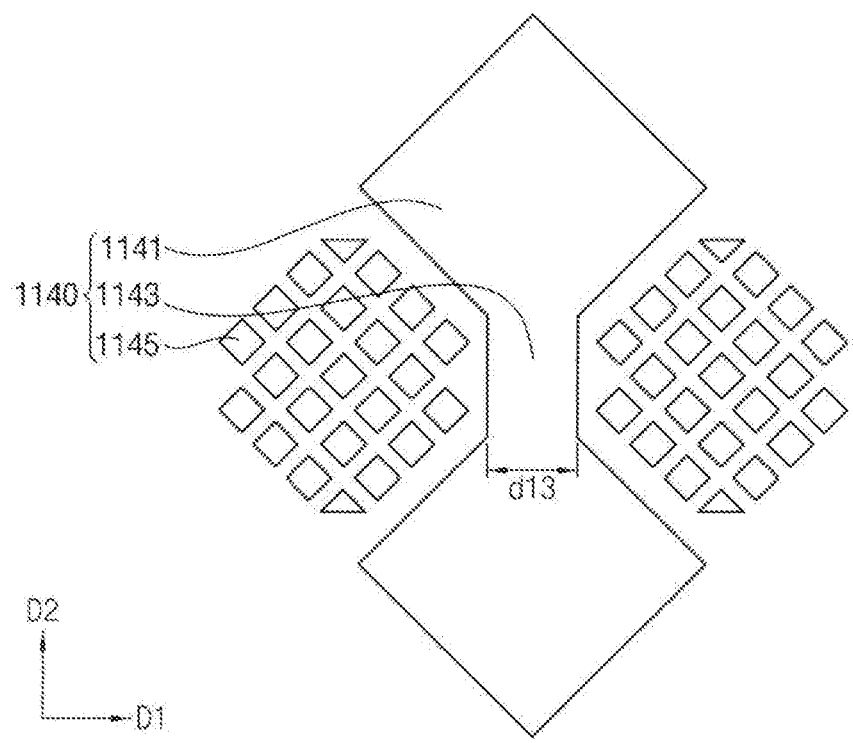
FIG. 15 is a schematic enlarged plan view of a portion "D" of the touch screen panel of FIG. 12 according to an exemplary embodiment.
Figure 17:
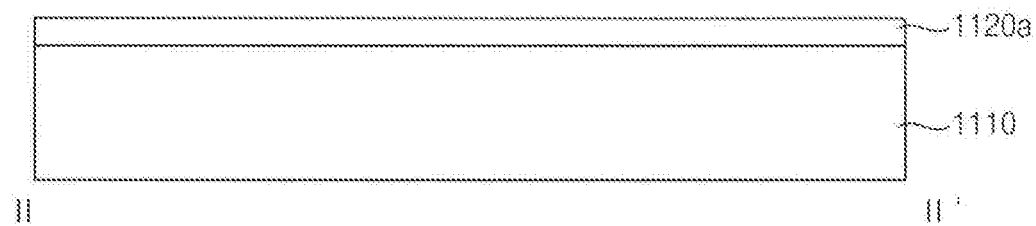
FIG. 17, FIG. 18, and FIG. 19 are cross-sectional views of the touch screen panel of FIG. 10 taken along sectional line II-II' according to an exemplary embodiment.
Figure 18:
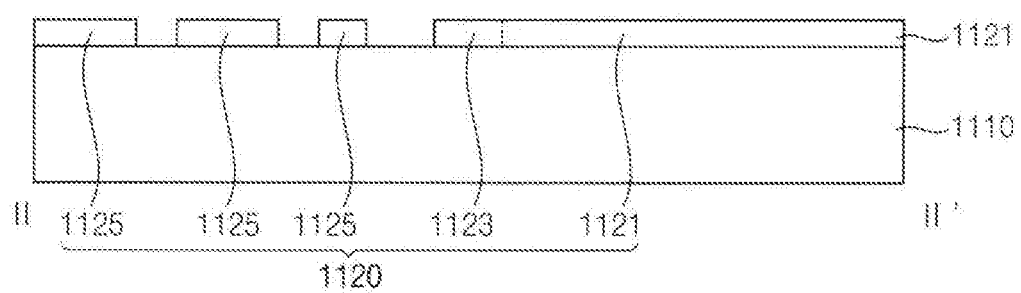
Figure 19:
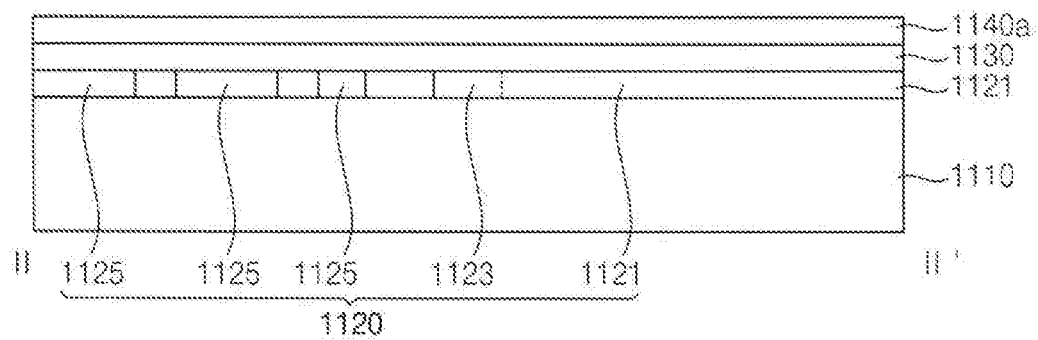

FIGS. 17 to 19 are cross-sectional views of the touch screen panel of FIG. 10 taken along sectional line II-II' according to an exemplary embodiment.

Referring to FIG. 17, a first touch electrode layer 1120a may be disposed on the base substrate 1110.

The base substrate 110 may include transparent materials. For example, the base substrate 110 may include at least one of quartz, synthetic quartz, calcium fluoride, fluoride-doping quartz, a soda lime glass, and a non-alkali glass.

The base substrate 1110 may include a flexible transparent resin substrate. For example, the flexible transparent resin substrate for the base substrate 1110 may include a polyimide substrate. The polyimide substrate may include a first polyimide layer, a barrier film layer, and a second polyimide layer. When the polyimide substrate is thin and flexible, the polyimide substrate may be disposed on a rigid glass substrate for the formation of the light emitting structure.

The base substrate 1110 may have a structure in which the first polyimide layer, the barrier film layer and the second polyimide layer are stacked on a glass substrate, but it is not limited thereto. The flexible transparent resin substrate may include various films. For example, the base substrate 1110 may include a Cyclo Olefin Polymer ("COP") film.

The first touch electrode layer 1120a may include a transparent conductive material. For example, the first touch electrode layer 1120a may include indium tin oxide ("ITO") or indium zinc oxide ("IZO").

Referring to FIG. 18, the first touch electrode layer 1120a disposed on the base substrate 1110 may be patterned to be formed the first touch electrode 1120.

The first touch electrode 1120 may include a first sensing pattern and a first dummy pattern 1125. The first sensing pattern may include a plurality of first sensing electrodes 1121 and a first sensing connecting portion 1123.

The first touch electrode 1120 may include a transparent conductive material. For example, the first touch electrode 1120 may include indium tin oxide ("ITO") or indium zinc oxide ("IZO").

Referring to FIG. 19, the insulation layer 1130 and a second touch electrode layer 1140a may be disposed on the base substrate 1110 on which the first touch electrode 1120 is disposed.

The insulation layer 1130 may be a dry film photoresist. When the insulation layer 1130 is a dry film photoresist, the dry film photoresist is used for forming a second touch electrode, and the dry film photoresist may provide an insulating function between the first touch electrode 1120 and the second touch electrode. The dry film photoresist may replace an insulation layer, and thus, a thickness of a display device may be decreased.

The second touch electrode layer 1140a may include a silver nanowire, but the present invention is not limited thereto. The second touch electrode layer 1140a may be formed of a metal nanowire, such as gold (Au), silver (Ag), or copper (Cu).

Figure 16:
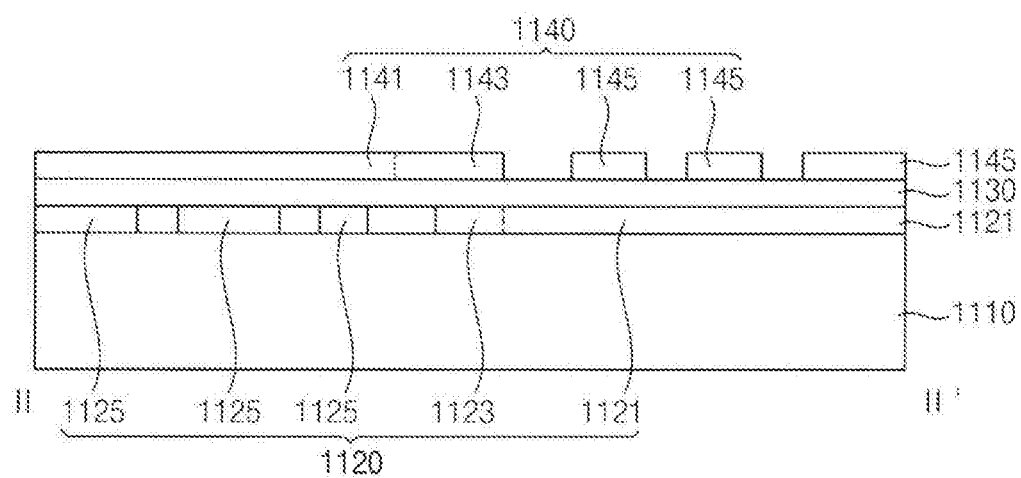
FIG. 16 is a cross-sectional view of the touch screen panel of FIG. 10 taken along sectional line II-II' according to an exemplary embodiment.

Referring to FIG. 16, the second touch electrode layer 1140a disposed on the insulation layer 1130 is patterned to from the second touch electrode 1140.

The second touch electrode 1140 may include a second sensing pattern and a second dummy pattern 1145. The second sensing pattern may include a plurality of second sensing electrodes 1141 and a second sensing connecting portion 1143.

The second touch electrode 1140 may include a silver nanowire, but the present invention is not limited thereto. The second touch electrode 1140 may include a metal nanowire, such as gold (Au), silver (Ag), or copper (Cu).

A sum of a thickness of the insulation layer 1130 and a thickness of the second touch electrode 1140 may be equal to or greater than 3 micrometers and equal to or less than 30 micrometers.

According to an exemplary embodiment, a width of the second sensing connecting portion may be large, and thus, damage to the second sensing connecting portion due to static electricity may be decreased. The second width of the second sensing connecting portion may be equal to or greater than one and a half times the first width of the first sensing connecting portion, and thus, a sensitivity difference in touch electrodes may be decreased. A sum of a thickness of the insulation layer and a thickness of the second touch electrode may be decreased, and thus, the performance of a touch sensor may be improved.

In addition, the first sensing connecting portion may include a first sub-sensing connecting portion disposed adjacent to the plurality of first sensing electrodes and having a third width and a second sub-sensing connecting portion connecting the first sub-sensing connecting portions and having a fourth width narrower than the third width. Since the first sensing connecting portion includes a first sub-sensing connecting portion having a large width, a resistance of the first sensing connecting portion may be decreased. In addition, damage to the first sensing connecting portion due to static electricity may be decreased.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:
1. A touch screen panel, comprising:
a base substrate;
a first touch electrode disposed on the base substrate, the first touch electrode comprising a plurality of first sensing electrodes disposed along a first direction and a first sensing connection portion disposed between and connected to each of the first sensing electrodes along the first direction, the first sensing connection portion having a first width in a plan view;

an insulation layer disposed on the first touch electrode; and a second touch electrode disposed on the insulation layer, the second touch electrode comprising a plurality of second sensing electrodes disposed along a second direction crossing the first direction and a second sensing connection portion disposed between and connected to each of the second sensing electrodes along the second direction, the second sensing connection portion having a second width in the plan view, wherein:

the plurality of first sensing electrodes and the first sensing connection portion are arranged in a first layer;

the plurality of second sensing electrodes and the second sensing connection portion are arranged in a second layer different from the first layer;

the second width is equal to or greater than one and a half times the first width, and less than or equal to two and a half times the first width;

the first sensing connection portion comprises:
- a first sub-sensing connecting portion disposed adjacent to the plurality of first sensing electrodes and having a third width in the plan view; and
- a second sub-sensing connecting portion connecting the first sub-sensing connecting portions and having a fourth width in the plan view; and the fourth width is less than the third width.

2. The touch screen panel of claim 1, wherein the first touch electrode comprises indium tin oxide ("ITO") or indium zinc oxide ("IZO").

3. The touch screen panel of claim 1, wherein the second touch electrode comprises a silver nanowire.

4. The touch screen panel of claim 1, wherein the first width is equal to or greater than 100 micrometers.

5. The touch screen panel of claim 1, wherein the second width is equal to or greater than 150 micrometers.

6. The touch screen panel of claim 1, wherein the insulation layer comprises a dry film photoresist.

7. The touch screen panel of claim 6, wherein a sum of a thickness of the insulation layer and a thickness of the second touch electrode is equal to or greater than 3 micrometers and equal to or less than 30 micrometers.

8. The touch screen panel of claim 1, wherein the first touch electrode comprises indium tin oxide ("ITO") or indium zinc oxide ("IZO").

9. The touch screen panel of claim 8, wherein the second touch electrode comprises a silver nanowire.

10. The touch screen panel of claim 8, wherein the first width is equal to or greater than 100 micrometers.

11. The touch screen panel of claim 8, wherein the second width is equal to or greater than 150 micrometers.

12. The touch screen panel of claim 8, wherein the insulation layer comprises a dry film photoresist.

13. The touch screen panel of claim 12, wherein a sum of a thickness of the insulation layer and a thickness of the second touch electrode is equal to or greater than 3 micrometers and equal to or less than 30 micrometers.

14. A method of manufacturing a touch screen panel comprising, the method comprising:

forming a first touch electrode on a base substrate;

forming an insulation layer on the first touch electrode; and forming a second touch electrode on the insulation layer, wherein forming the first touch electrode comprises:
- forming a plurality of first sensing electrodes in a first direction; and
- forming a first sensing connection portion with a first width in a plan view between each of the first sensing electrodes to connect the first sensing electrodes in the first direction, wherein forming the second touch electrode comprises:
- forming a plurality of second sensing electrodes in a second direction crossing the first direction; and
- forming a second sensing connection portion with a second width in the plan view between each of the second sensing electrodes to connect the second sensing electrodes in the second direction, and wherein:

the plurality of first sensing electrodes and the first sensing connection portion are arranged in a first layer;

the plurality of second sensing electrodes and the second sensing connection portion are arranged in a second layer different from the first layer;

the second width is equal to or greater than one and a half times the first width, and less than or equal to two and a half times the first width;

forming the first sensing connection portion comprises:
- forming a first sub-sensing connecting portion with a third width in the plan view disposed adjacent to the plurality of first sensing electrodes; and
- forming a second sub-sensing connecting portion with a fourth width in the plan view connecting the first sub-sensing connecting portions; and the fourth width is less than the third width.

15. The method of claim 14, wherein the first touch electrode comprises indium tin oxide (ITO) or indium zinc oxide (IZO), and the second touch electrode comprises a silver nanowire.

16. The method of claim 14, wherein the first width is equal to or greater than 100 micrometers, and the second width is equal to or greater than 150 micrometers.

17. The method of claim 14, wherein the insulation layer comprises a dry film photoresist.

18. The method of claim 17, wherein a sum of a thickness of the insulation layer and a thickness of the second touch electrode is equal to or greater than 3 micrometers and equal to or less than 30 micrometers.

* * * * *